Patented Aug. 16, 1949

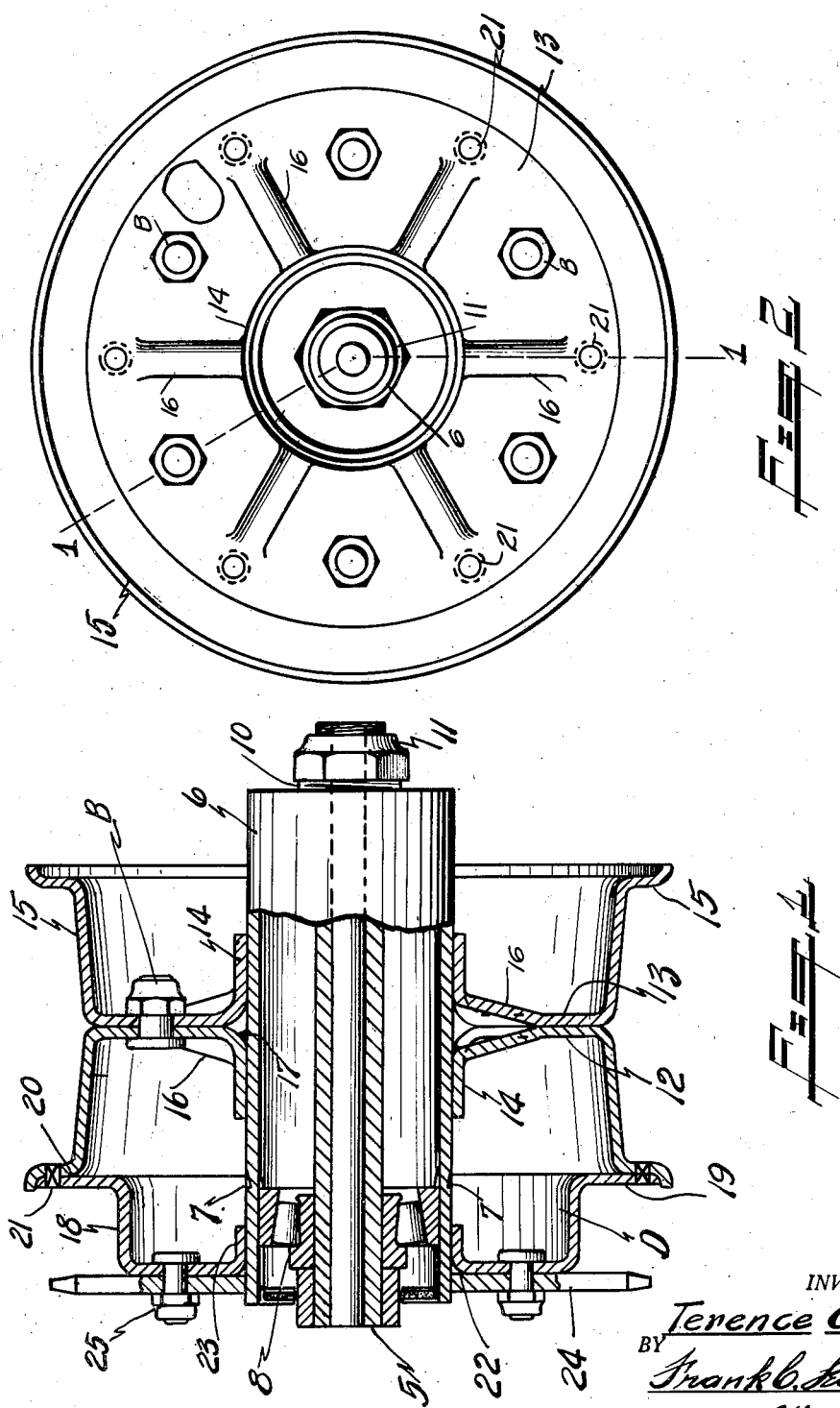

2,479,162

UNITED STATES PATENT OFFICE 2,479,162

REAR WHEEL AND SPROCKET ASSEMBLY

Terence G. Hare, Saginaw, Mich., assignor to Saginaw Products Corporation, Saginaw, Mich.

Application March 7, 1945, Serial No. 581,511

5 Claims. (Cl. 301—6)

This invention relates to a combination pressed steel wheel and driving means such as used on motorcycles and similar devices for connecting the wheel with the power plant of the vehicle.

One of the prime objects of the invention is to design a unitary wheel, brake drum, and driving means which can be readily assembled and mounted and to which the mobile power and brake can be readily connected.

Another object is to design a combination rear wheel and sprocket assembly including a cylindrical stamped laterally projecting structure welded to the rim section of the wheel, the cylindrical section of said member forming a brake drum to which a drive sprocket can be readily connected.

Still a further object is to provide a unitary pressed wheel and brake drum on which a drive sprocket is mounted, which drum is designed to equalize and balance all braking and driving strains with the torque applied at the rim of the wheel structure.

A further object still is to design a pressed steel wheel which can be readily welded and which is provided with pressed spoke sections forming recesses to accommodate the welds, the design eliminating distortion or misalignment of the members due to the welding operation.

A further object is to design a unitary wheel and offset brake drum structure in which the driving torque is applied at the point of connection of the wheel discs to the hub with the brake and sprocket drive torque applied at the outer rim of the wheel.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a sectional, side-elevational view taken on the line 1—1 of Fig. 2, the hub being broken away to more clearly show the construction.

Fig. 2 is an end-elevational view.

In the accompanying drawing there is shown an axle 5 mounted in a tubular hub 6, which hub is indented as at 7 to form shoulders for the conventional roller bearing assemblies 8 which are interposed between the hub and axle in the usual manner, the end of the axle being threaded as at 10 to receive a nut 11 as usual.

A pair of opposed pressed disc members 12 and 13 respectively are welded on the hub 6 and are secured together in facial contact by means of bolts B, each disc having an inner horizontally disposed flange 14 for engagement with the hub, and the outer section 15 of the discs being shaped to form a rim on which a conventional tire (not shown) is mounted.

Spaced apart ribs 16 are pressed in each of the disc sections 12 and 13, and the discs are welded to the hub, the welds 17 being located on the hub within the space formed by the pressing of the ribs so that ample space is provided and so that there is no distortion or buckling of the metal at the point of weld.

A brake drum section D is provided on the one end of the wheel as shown, this is also a pressed steel member and comprises a cylindrical offset drum section 18 terminating in a flange 19 which fits the flat section 20 of the rim and is secured thereto by a plurality of welds 21.

The outer end face of the drum D is closed, and a centrally disposed flanged opening 22 is provided therein, the flange 23 engaging the cylindrical hub and provides a firm bearing thereon, and a drive sprocket 24 is secured to the end wall of the drum by means of bolts 25, suitable driving means (not shown) connecting the sprocket to any suitable source of power.

I wish to direct particular attention to the fact that the drive sprocket is connected to the drum at a point directly adjacent the wheel bearing, with the flange 19 of the drum connected at the rim of the wheel, so that the driving torque is applied at the outer periphery of the wheel and thence through the discs 12 and 13 to the hub, the drum and wheel forming a rigid box-like unitary structure mounted on a common hub.

The cylindrical section 18 forms an ideal brake drum as it too is directly adjacent the point of application of the driving power and is so located that it can be easily and quickly attached or removed. This construction makes the drive sprocket, brake drum and associated parts readily accessible for any required purpose, and the construction is rigid, substantial and economical.

From the foregoing description, it will be obvious that I have perfected a very simple, practical, economical rear wheel and sprocket assembly for motorcycles and the like.

What I claim is:

1. A combination wheel and sprocket assembly of the class described comprising, a pressed wheel member having turned edges formed with a plurality of spaced-apart openings therein, a laterally projecting cylindrical drum section formed with a flange shaped to fit one of the said turned edges and provided with openings disposed in alignment with the openings in the turned edges of the wheel to facilitate welding the rim of said wheel member and nest in the turned edge of the rim, said drum having a centrally disposed flanged opening therein, an individual hub rigidly connected to the wheel and common to said wheel and drum section, and a driving member rigidly secured to the end wall of said drum section at a point closely adjacent the rim of the brake drum.

2. A rear wheel sprocket assembly comprising a pressed wheel having turned rim sections and including a hub, an axle, a pressed, flanged brake drum nested in one of the rim sections and welded thereto, a centrally disposed opening in the end face of the brake drum, an integral inwardly projecting sleeve surrounding said opening and rigidly mounted on said hub, and a driving member secured to the end wall of the drum at a point closely adjacent the rim of the drum.

3. The combination with a pressed wheel having a hub and a rim, of a driven, laterally-projecting flanged brake drum mounted on said hub with its upper flanged edge nested in and secured to the rim of the wheel, aligned openings in the rim and flange respectively to accommodate the welds, said flange forming the driving connection between said drum and wheel, and a sprocket member detachably secured to the outer face of the drum section at a point closely adjacent the outer periphery of the brake drum.

4. A combination pressed rear wheel and sprocket assembly comprising, a hub, pressed steel wheel disc members mounted thereon in facial contact and terminating in a tire receiving rim section, tapered spokes pressed in said discs for reinforcing the discs, and a laterally projecting brake drum and sprocket assembly rigidly mounted on said hub with its outer peripheral edge nested in the rim of one of said disc members, aligned openings in the rim and peripheral edge of the brake drum respectively to facilitate welding them together, said welds forming the driving connection between said brake drum and wheel.

5. A combination rear wheel and sprocket assembly comprising, an individual hub, an axle, a pressed wheel member having turned edges mounted on said hub and rigidly welded thereto, a laterally projecting flanged brake drum nested in and welded to the turned edge of the rim of the wheel aligned openings in the turned edges and brake drum flange respectively to accommodate the welds, a centrally flanged opening in the brake drum adapted to accommodate said hub, and a driving member detachably secured to said brake drum at a point closely adjacent the rim of the outer periphery of the brake drum.

TERENCE G. HARE.

REFERENCES CITED

The following references are of record in the file of this patent:

UNITED STATES PATENTS

| Number | Name | Date |
|---|---|---|
| 911,922 | Towson | Feb. 9, 1909 |
| 1,378,300 | Williams | May 17, 1921 |
| 1,940,541 | Gettinger | Dec. 19, 1933 |
| 1,993,430 | Bell | Mar. 5, 1935 |
| 2,018,913 | Cautley | Oct. 29, 1935 |
| 2,186,996 | Short | Jan. 16, 1940 |
| 2,348,550 | Kroft et al. | May 9, 1944 |

FOREIGN PATENTS

| Number | Country | Date |
|---|---|---|
| 256,880 | Great Britain | Aug. 19, 1926 |
| 323,617 | Great Britain | Jan. 9, 1930 |